(12) United States Patent
Shoji

(10) Patent No.: US 12,524,633 B2
(45) Date of Patent: Jan. 13, 2026

(54) COMMUNICATION APPARATUS THAT COMMUNICATES TAG INFORMATION WITH ANOTHER COMMUNICATION APPARATUS

(71) Applicant: CANON KABUSHIKI KAISHA, Tokyo (JP)

(72) Inventor: Kazuki Shoji, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 42 days.

(21) Appl. No.: 18/525,532

(22) Filed: Nov. 30, 2023

(65) Prior Publication Data

US 2024/0185008 A1 Jun. 6, 2024

(30) Foreign Application Priority Data

Dec. 2, 2022 (JP) .................. 2022-193606

(51) Int. Cl.
*G06K 7/10* (2006.01)
(52) U.S. Cl.
CPC ................. *G06K 7/10366* (2013.01)
(58) Field of Classification Search
CPC ........ G06K 7/10366; G06K 7/10475

USPC ............... 235/451; 340/10.1–10.52
See application file for complete search history.

(56) References Cited

U.S. PATENT DOCUMENTS

| | | | |
|---|---|---|---|
| 2008/0061936 A1* | 3/2008 | Park ............ | G06K 7/0008 340/572.1 |
| 2008/0252426 A1 | 10/2008 | Lee | |
| 2010/0048132 A1* | 2/2010 | Sugisaki ........ | H04L 67/06 455/41.3 |

FOREIGN PATENT DOCUMENTS

JP 2013219458 A 10/2013

\* cited by examiner

*Primary Examiner* — Suezu Ellis
(74) *Attorney, Agent, or Firm* — Canon U.S.A., Inc. IP Division

(57) ABSTRACT

A communication apparatus capable of executing reading of an RFID tag, the communication apparatus includes an approach detection unit that detects, by using a predetermined communication method, approach of the communication apparatus to another communication apparatus capable of executing reading of the RFID tag, and a reception unit that receives, by using the predetermined communication method, information of the RFID tag read by the other communication apparatus from the other communication apparatus.

11 Claims, 12 Drawing Sheets

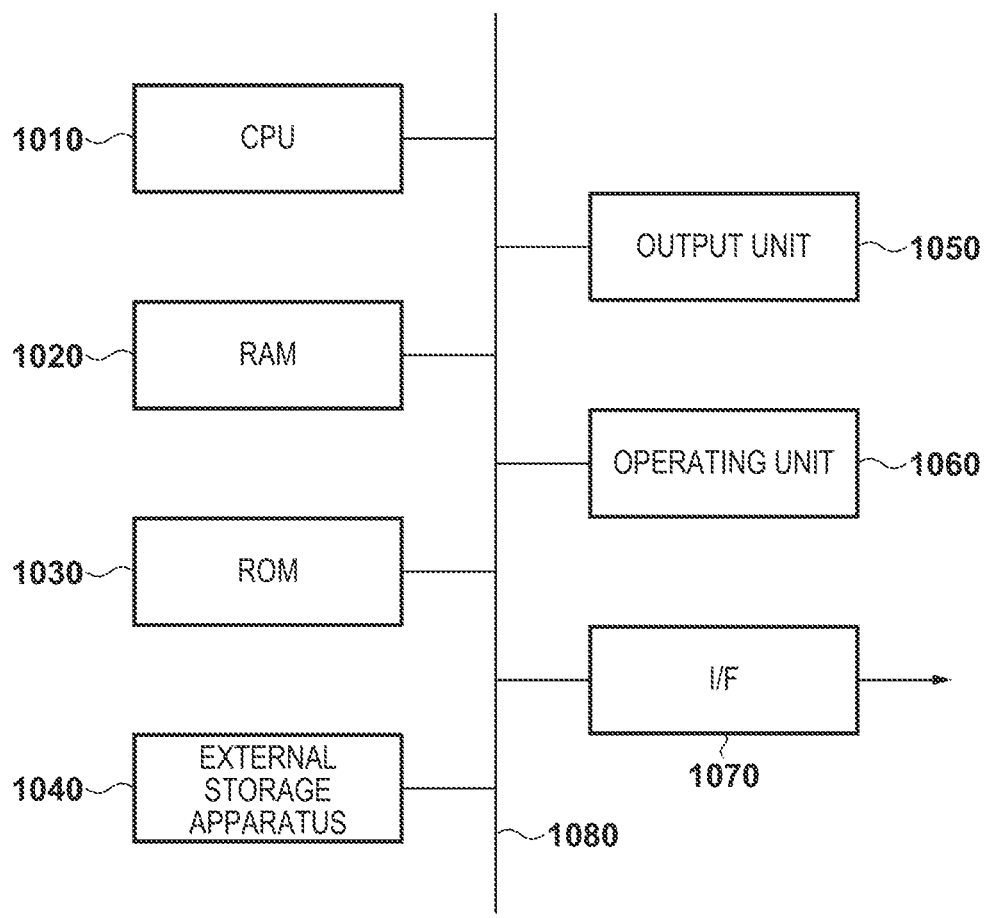

COMMUNICATION APPARATUS THAT COMMUNICATES TAG INFORMATION WITH ANOTHER COMMUNICATION APPARATUS

BACKGROUND

Field

The present disclosure relates to a communication apparatus, a control method of the communication apparatus, and a non-transitory computer-readable storage medium.

Description of the Related Art

In logistics and inventory management, a system for managing a management target article by using an Ultra High Frequency (UHF) band Radio Frequency Identification (RFID) reader apparatus and an RFID passive tag is widely used.

In such a management system, the position information of the RFID reader apparatus is acquired by a user carrying the RFID reader apparatus and reading the RFID passive tag indicating a reference position at the destination of movement. Further, if there is an RFID passive tag for article management in the vicinity, the position information of the article is acquired and managed by simultaneously reading the RFID passive tag for article management.

In the RFID control system including the RFID apparatus and the RFID passive tag, the frequency band used for communication with the RFID passive tag is shared by another RFID reader apparatus or another communication apparatus. Therefore, a communication collision can occur.

In order to avoid such a collision, the RFID reader apparatus needs to confirm before transmission that no other apparatus is using the frequency to be used by the self-apparatus. This collision avoidance method is called Listen Before Talk (LBT), and a carrier sense function is often used. The carrier sense function is a function in which the reader apparatus preparing for transmission determines, prior to the transmission, the presence/absence of another reader apparatus already in communication with an RFID tag by detecting the presence/absence of a carrier signal transmitted/received between the other reader apparatus and the RFID tag.

Japanese Patent Laid-Open No. 2013-219458 discloses that an RFID reader apparatus performs simple preliminary carrier sense for all channels to grasp free channels, thereby shortening the total time required to execute the carrier sense function.

However, in a case in which there are a few free channels so that the RFID reader apparatus has to use the same channel as another RFID reader, with the technique described in Japanese Patent Laid-Open No. 2013-219458, the carrier sense function is operated when approaching the other RFID reader, and one of the RFID readers enters an LBT waiting state.

Accordingly, when the technique disclosed in Japanese Patent Laid-Open No. 2013-219458 is used in the system in which the user carries the RFID reader apparatus and acquires the position information by reading the RFID tag indicating the reference position, if another RFID reader exists at the destination of movement, the RFID reader apparatus enters the LBT waiting state and cannot acquire the information of the tag.

SUMMARY

The present disclosure has been made in consideration of the above-described problem, and provides a technique for enabling acquisition of information of an RFID tag even if RFID reader apparatuses approach each other and enter a waiting state.

According to one aspect of the present disclosure, there is provided a communication apparatus capable of executing reading of an RFID tag, the communication apparatus includes an approach detection unit that detects, by using a predetermined communication method, approach of the communication apparatus to another communication apparatus capable of executing reading of the RFID tag, and a reception unit that receives, by using the predetermined communication method, information of the RFID tag read by the other communication apparatus from the other communication apparatus.

Further features of the present disclosure will become apparent from the following description of exemplary embodiments with reference to the attached drawings.

BRIEF DESCRIPTION OF THE DRAWINGS

FIG. 7 is a block diagram showing an example of the hardware arrangement of the RFID reader according to an embodiment.

DESCRIPTION OF THE EMBODIMENTS

Figure 1:
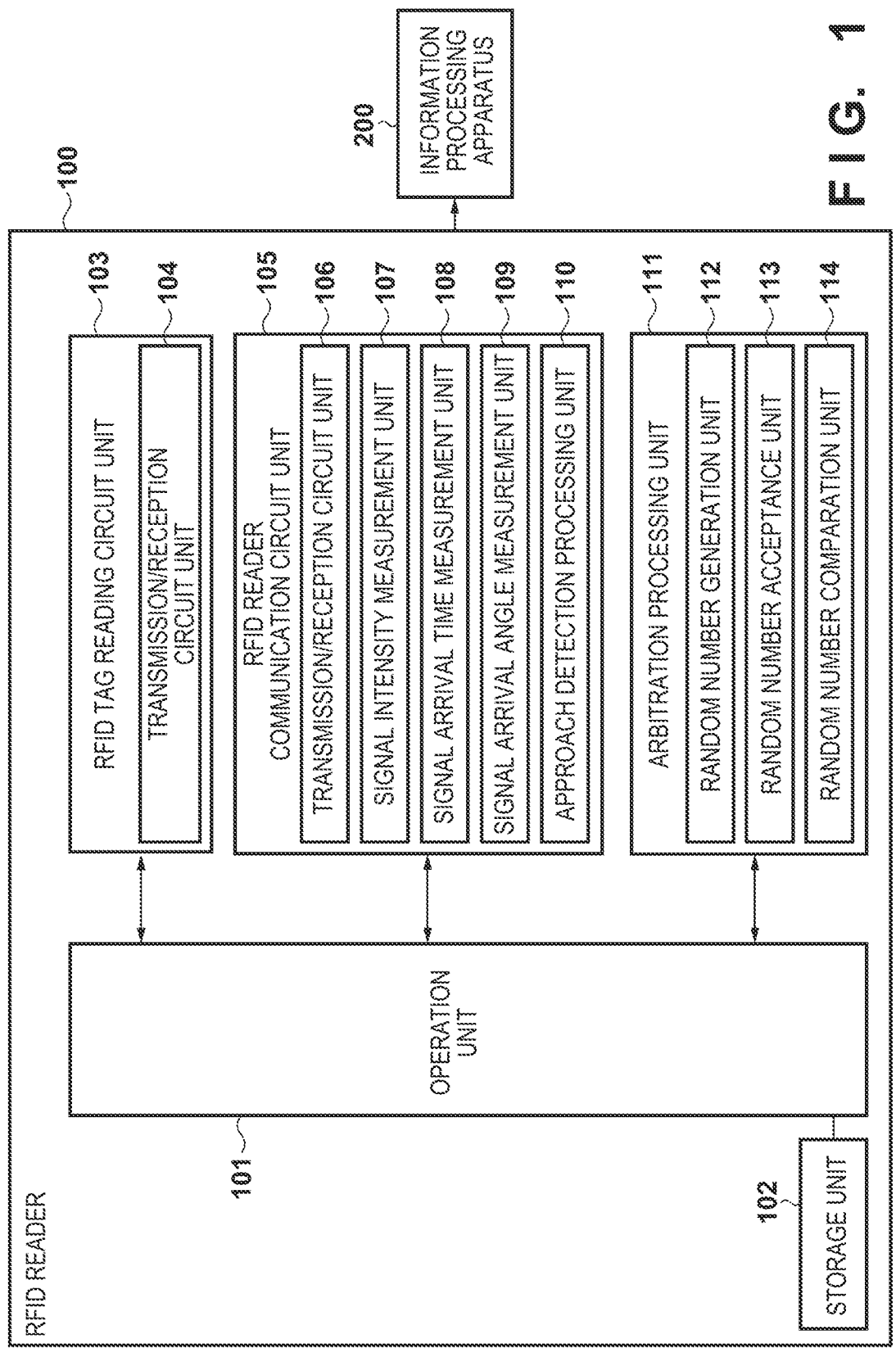
FIG. 1 is a block diagram showing the configuration of a system including an RFID reader and an information processing apparatus according to an embodiment.

Hereinafter, embodiments will be described in detail with reference to the attached drawings. Note, the following embodiments are not intended to limit the scope of the attached claims. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

First Embodiment

In this embodiment, a description will be given while taking, as an example, an article position management system that uses portable reader apparatuses (to be referred to as RFID readers hereinafter), a reference RFID tag (to be referred to as a reference tag hereinafter) indicating a reference position, and an article RFID tag (to be referred to as an article tag) attached to an article. If an approach between the RFID readers is detected, the RFID reader receives the reading result of the RFID tag from the other RFID reader by a communication method other than RFID.

System Configuration

FIG. 1 is a block diagram showing an example of the configuration of an article position management system including an RFID reader 100 (communication apparatus) capable of executing RFID tag reading, and an information processing apparatus 200 according to the first embodiment.

The RFID reader 100 wirelessly reads out information from an RFID tag which is an external communication object. For example, the RFID reader 100 supplies a UHF band electromagnetic wave to the RFID tag to operate an IC chip inside the RFID tag, thereby reading out reference position information or article management information stored in a storage unit of the RFID tag.

The RFID reader 100 is a communication apparatus that can read a reference tag or an article tag existing in a wide range by being carried by a moving body, and notifies the information processing apparatus 200 of the reading result. Based on the information notified from the RFID reader 100, the information processing apparatus 200 links the reference position information of the RFID tag reading result and the article management information, thereby managing the position of each article.

The RFID reader 100 can manage the position of an article by reading the reference tag, and simultaneously reading the article tag if the article attached with the article tag exists in the vicinity. The RFID reader 100 is a moving body, and a plurality of RFID readers 100 can exist in the same space (only one RFID reader is shown in the example of FIG. 1). Each RFID reader reads the RFID tag as a standalone apparatus, and uploads the reading result to a cloud via the information processing apparatus 200 serving as a server. The RFID reader 100 can acquire its position information by reading the reference tag.

Hardware Arrangement of RFID Reader

FIG. 7 is a block diagram showing an example of the hardware arrangement of the RFID reader 100 according to this embodiment. A Central Processing Unit (CPU) 1010 controls the entire computer by using computer programs and data stored in a Random Access Memory (RAM) 1020 and a Read Only Memory (ROM) 1030. The CPU 1010 executes each processing performed by the RFID reader 100 according to this embodiment. That is, the CPU 1010 functions as each processing unit shown in FIG. 1.

The RAM 1020 has an area for temporarily storing a computer program and data loaded from an auxiliary storage apparatus 1040 or the ROM 1030, data acquired from the outside via an I/F (interface) 1070, and the like. The RAM 1020 further has a work area used by the CPU 1010 to execute various kinds of processes. The ROM 1030 stores computer setting data, a boot program, and the like.

The auxiliary storage apparatus 1040 is a mass data storage apparatus represented by a hard disk drive apparatus. The auxiliary storage apparatus 1040 stores an Operating System (OS), and a computer program for causing the CPU 1010 to implement the functions of respective processing units shown in FIG. 1. An output unit 1050 outputs a processing result of the CPU 1010. "Output" can include, for example, "display", "notify", and "transmit data to the outside". The output unit 1050 is formed from, for example, a liquid crystal display or a loudspeaker. An operating unit 1060 can be formed from a physical button, a keyboard, a mouse, or the like. A user can input various kinds of instructions to the CPU 1010 by operating the operating unit 1060. Networks such as a Local Area Network (LAN) and the Internet and another equipment can be connected to the I/F 1070, and the computer can acquire and send various pieces of information via the I/F 1070. A bus 1080 is a bus connecting respective units described above.

Functional Arrangement of RFID Reader

As shown in FIG. 1, the RFID reader 100 includes an operation unit 101, a storage unit 102, an RFID tag reading circuit unit 103, an RFID reader communication circuit unit 105, and an arbitration processing unit 111. The RFID tag reading circuit unit 103 includes a transmission/reception circuit unit 104 that performs communication using RFID.

The operation unit 101 corresponds to the CPU 1010, and implements various kinds of control operations of the RFID reader 100. The storage unit 102 corresponds to the RAM 1020, the ROM 1030, the external storage apparatus 1040, and the like, and stores various kinds of data.

The RFID reader communication circuit unit 105 communicates with another RFID reader by using a communication method different from RFID under the control of the operation unit 101, thereby measuring the distance between the RFID reader 100 and the other RFID reader. For example, the RFID reader communication circuit unit 105 can be configured to be capable of communication using an Ultra Wide Band (UWB) communication method or a Bluetooth® communication method.

The operation unit 101 acquires the measurement result of the distance between the RFID reader 100 and the other RFID reader from the RFID reader communication circuit unit 105, and detects approach of the RFID reader 100 to the other RFID reader by controlling an approach detection processing unit 110. For example, if the distance between the RFID reader 100 and the other RFID reader is equal to or smaller than a threshold value, it can be determined that the RFID readers approach each other. If the approach to the other RFID reader is detected, the approach detection processing unit 110 communicates with the other RFID reader by using the communication function of the RFID reader communication circuit unit 105 under the control of the operation unit 101 to inquire whether RFID tag reading is executed.

As a result of the inquiry, if the other RFID reader is in execution of RFID tag reading, the approach detection processing unit 110 requests, by using the communication function of the RFID reader communication circuit unit 105, the other RFID reader to transmit an RFID tag reading result. Then, the RFID reader 100 receives the RFID tag reading result from the other RFID reader.

The RFID tag reading circuit unit 103 functions as a tag detection unit that executes reading of a reference tag which is an RFID tag serving as a reference for specifying the position, or an article tag attached to an article serving as a management target. The RFID tag reading circuit unit 103 also functions as a calculation unit that calculates the position of the RFID reader 101 with respect to the reference tag based on the reading result of the reference tag. The RFID tag reading circuit unit 103 can also calculate the position of a management target attached with an article tag by reading the article tag and using it together with the position information of the reference tag.

The RFID reader communication circuit unit 105 includes a transmission/reception circuit unit 106, a signal intensity measurement unit 107, a signal arrival time measurement unit 108, a signal arrival angle measurement unit 109, and the approach detection processing unit 110. The transmission/reception circuit unit 106 transmits/receives signals to/from another RFID reader. The signal intensity measurement unit 107 measures the intensity of the signal received by the transmission/reception circuit unit 106. The signal arrival time measurement unit 108 measures the arrival time of the signal received by the transmission/reception circuit unit 106. The signal arrival angle measurement unit 109 measures the arrival angle of the signal received by the transmission/reception circuit unit 106.

From the measurement results of the signal arrival time measurement unit 108 and the signal arrival angle measurement unit 109, the approach detection processing unit 110 detects approach of the RFID reader 100 to another RFID reader. The approach detection processing unit 110 can also detect approach of the RFID reader 100 to another RFID reader from the measurement result of the signal intensity measurement unit 107.

The arbitration processing unit 111 includes a random number generation unit 112, a random number acceptance unit 113, and a random number comparison unit 114. The arbitration processing unit 111 compares the random numbers generated by the respective RFID readers, and arbitrates execution of RFID tag reading between the RFID readers. That is, the arbitration processing unit 111 decides (arbitrates) one of the RFID reader 100 and the other RFID reader to execute reading.

The random number generation unit 112 generates a random number for arbitration. The random number acceptance unit 113 communicates with the other RFID reader by using a communication method (for example, UWB or Bluetooth®) other than RFID to receive, from the other RFID reader, a random number for arbitration generated by the other RFID reader. The random number comparison unit 114 compares the random number for arbitration generated by the RFID reader 100 with the random number for arbitration received from the other RFID reader. For example, the RFID reader with the largest random number may be decided to execute reading.

Note that the function of the arbitration processing unit 111 will be mainly described in the second embodiment. Therefore, the RFID reader 100 may not include the arbitration processing unit 111 in the first embodiment.

Process

Figure 2A:
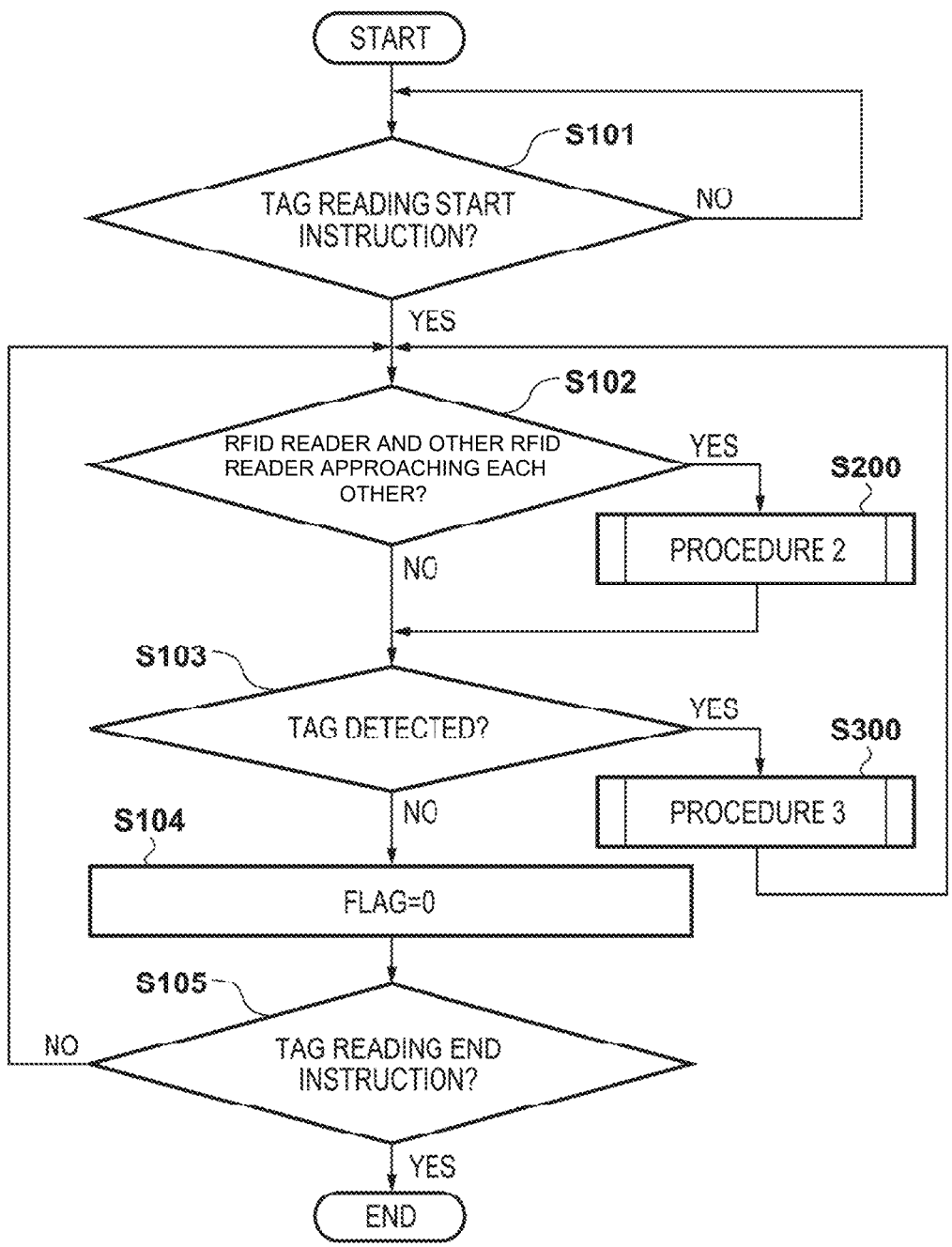
FIG. 2A is a flowchart illustrating the procedure of the overall process executed by an RFID reader according to the first embodiment.
Figure 2B:
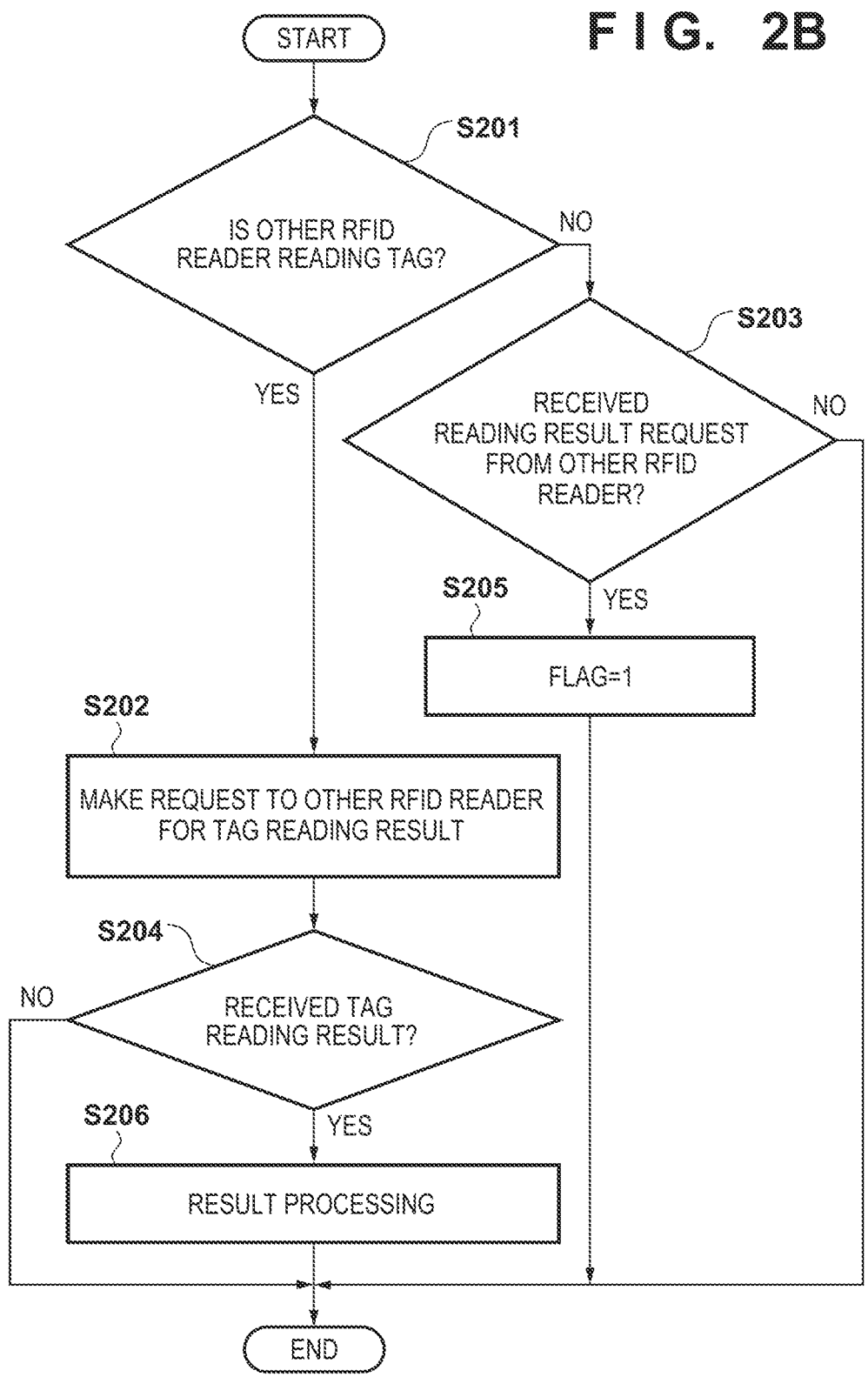
FIG. 2B is a flowchart illustrating the procedure of RFID reader approaching processing according to the first embodiment.
Figure 2C:
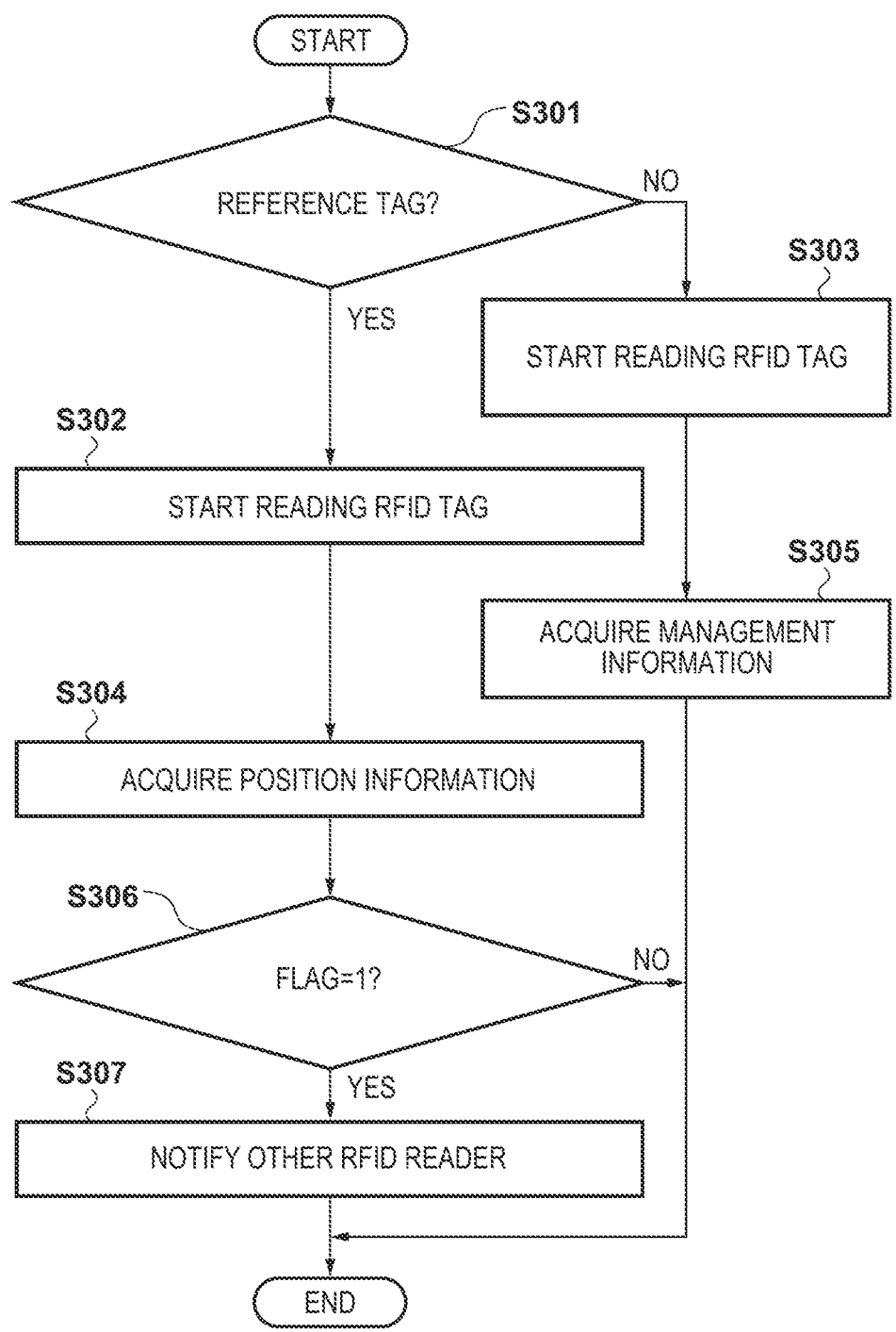
FIG. 2C is a flowchart illustrating the procedure of tag information acquisition processing according to the first embodiment.

Subsequently, with reference to flowcharts of FIGS. 2A to 2C, the procedure of a process executed by the RFID reader according to the first embodiment will be described. FIG. 2A is a flowchart illustrating the procedure of the overall process executed by the RFID reader according to the first embodiment. FIG. 2B is a flowchart illustrating the procedure of RFID reader approaching processing (details of step S200) according to the first embodiment. FIG. 2C is a flowchart illustrating the procedure of tag information acquisition processing (details of step S300) according to the first embodiment.

The process illustrated in FIG. 2A can be implemented, for example, when the operation unit 101 of the RFID reader 100 executes a program stored in the storage unit 102 in accordance with the ON state of the power supply of the RFID reader 100.

In step S101, the RFID reader 100 determines the presence/absence of an RFID tag reading start instruction from the user. The RFID tag reading start instruction from the user can be accepted via an operation input of the operating unit 1060. The operating unit 1060 may be implemented by, for example, a touch panel. If a reading start instruction is input, the RFID reader 100 periodically operates the RFID tag reading circuit unit 103 to communicate with an RFID tag, and starts control for performing communication with the RFID tag via the transmission/reception circuit unit 104. Then, the RFID reader 100 advances to step S102. On the other hand, if no reading start instruction is input, the RFID reader 100 waits.

In step S102, the RFID reader 100 measures the distance between the RFID reader 100 and another RFID reader by using the distance measurement function of the RFID reader communication circuit unit 105, thereby performing approach detection determination between the RFID reader 100 and another RFID reader. For example, if the distance between the RFID reader 100 and another RFID reader is equal to or smaller than a threshold value, it is determined that the RFID readers approach each other. If approach of the RFID reader 100 to another RFID reader is detected, the RFID reader 100 advances to step S200. On the other hand, if approach of the RFID reader 100 to another RFID reader is not detected, the RFID reader 100 advances to step S103.

Here, with reference to FIG. 2B, details of the RFID reader approaching processing in step S200 will be described.

In step S201, the RFID reader 100 determines whether the other RFID reader in an approach state is in execution of RFID tag reading. More specifically, the RFID reader 100 inquires, by using the communication function of the RFID reader communication circuit unit 105, of the other RFID reader whether RFID tag reading is executed, and performs the determination based on the inquiry result. If the other RFID reader is in execution of RFID tag reading, the RFID reader 100 advances to step S202. On the other hand, if the other RFID reader is not in execution of RFID tag reading, the RFID reader 100 advances to step S203.

In step S202, the RFID reader 100 requests, by using the communication function of the RFID reader communication circuit unit 105, the other RFID reader in the approach state to transmit an RFID tag reading result. If the RFID tag reading result is stored in the storage unit 102, the other RFID reader having received the transmission request transmits the reading result to the RFID reader 100. On the other hand, if no RFID tag reading result is stored, the other RFID reader does not perform transmission to the RFID reader 100.

In step S203, the RFID reader 100 determines whether a transmission request of an RFID tag reading result is received from the other RFID reader. If a transmission request of an RFID tag reading result is received from the other RFID reader, the RFID reader 100 advances to step S205. On the other hand, if no transmission request of an RFID tag reading result is received from the other RFID reader, the RFID reader 100 terminates the processing, and advances to step S103.

In step S204, the RFID reader 100 determines whether the RFID tag reading result is received from the other RFID reader. If the RFID tag reading result is received from the other RFID reader, the RFID reader 100 advances to step S206. On the other hand, if the RFID tag reading result is not received from the other RFID reader, the RFID reader 100 terminates the processing, and advances to step S103.

In step S205, the RFID reader 100 performs flag processing to indicate that a transmission request of an RFID tag reading result has been received from the other RFID reader (sets a flag=1), terminates the processing, and advances to step S103.

In step S206, the RFID reader 100 acquires position information from the RFID tag reading result received from the other RFID reader, and notifies, of the position information, the information processing apparatus 200 that manages the position information. Then, the RFID reader 100 terminates the processing, and advances to step S103.

Referring back to FIG. 2A, in step S103, the RFID reader 100 determines whether an RFID tag is detected. If an RFID tag is detected, the RFID reader 100 advances to step S300. On the other hand, if no RFID tag is detected, the RFID reader 100 advances to step S104.

Here, with reference to FIG. 2C, details of the tag information acquisition processing in step S300 will be described.

In step S301, the RFID reader 100 determines whether the detected RFID tag is a reference tag. If the detected RFID tag is a reference tag, the RFID reader 100 advances to step S302. On the other hand, if the detected RFID tag is not a reference tag, the RFID reader 100 advances to step S303. In step S302, the RFID reader 100 executes reading of the RFID tag (reference tag). In step S303, the RFID reader 100 executes reading of the RFID tag (the tag which is not a reference tag but, for example, an article tag). In step S304, the RFID reader 100 acquires position information. Then, the RFID reader 100 advances to step S306. In step S305, the RFID reader 100 acquires management information (for example, information read from the article tag). Then, the RFID reader 100 terminates the processing, and advances to step S102.

In step S306, the RFID reader 100 determines whether a transmission request of the RFID tag reading result has been received from the other RFID reader. If the flag=1, the RFID reader 100 determines that a transmission request of the RFID tag reading result has been received from the other RFID reader, and advances to step S307. On the other hand, if the flag #1, the RFID reader 100 determines that a transmission request of the RFID tag reading result has not been received from the other RFID reader. In this case, the RFID reader 100 terminates the processing, and advances to step S102.

In step S307, the RFID reader 100 transmits, by using the communication function of the RFID reader communication circuit unit 105, the RFID tag reading result to the other RFID reader. Then, the RFID reader 100 terminates the processing, and advances to step S102.

Referring back to FIG. 2A, in step S104, the RFID reader 100 initializes the flag indicating whether a transmission request of an RFID tag reading result is received from the other RFID reader (sets the flag=0), and advances to step S105.

In step S105, the RFID reader 100 determines whether an RFID tag reading end instruction is accepted from the user. If an RFID tag reading end instruction is accepted from the user, the RFID reader 100 stops the operation of the RFID tag reading circuit unit 103, thereby stopping the communication with the RFID tag. On the other hand, if no RFID tag reading end instruction is accepted from the user, the RFID reader 100 returns to step S102. A series of processing has been described above.

Operation Example of RFID Reader

Figure 3:
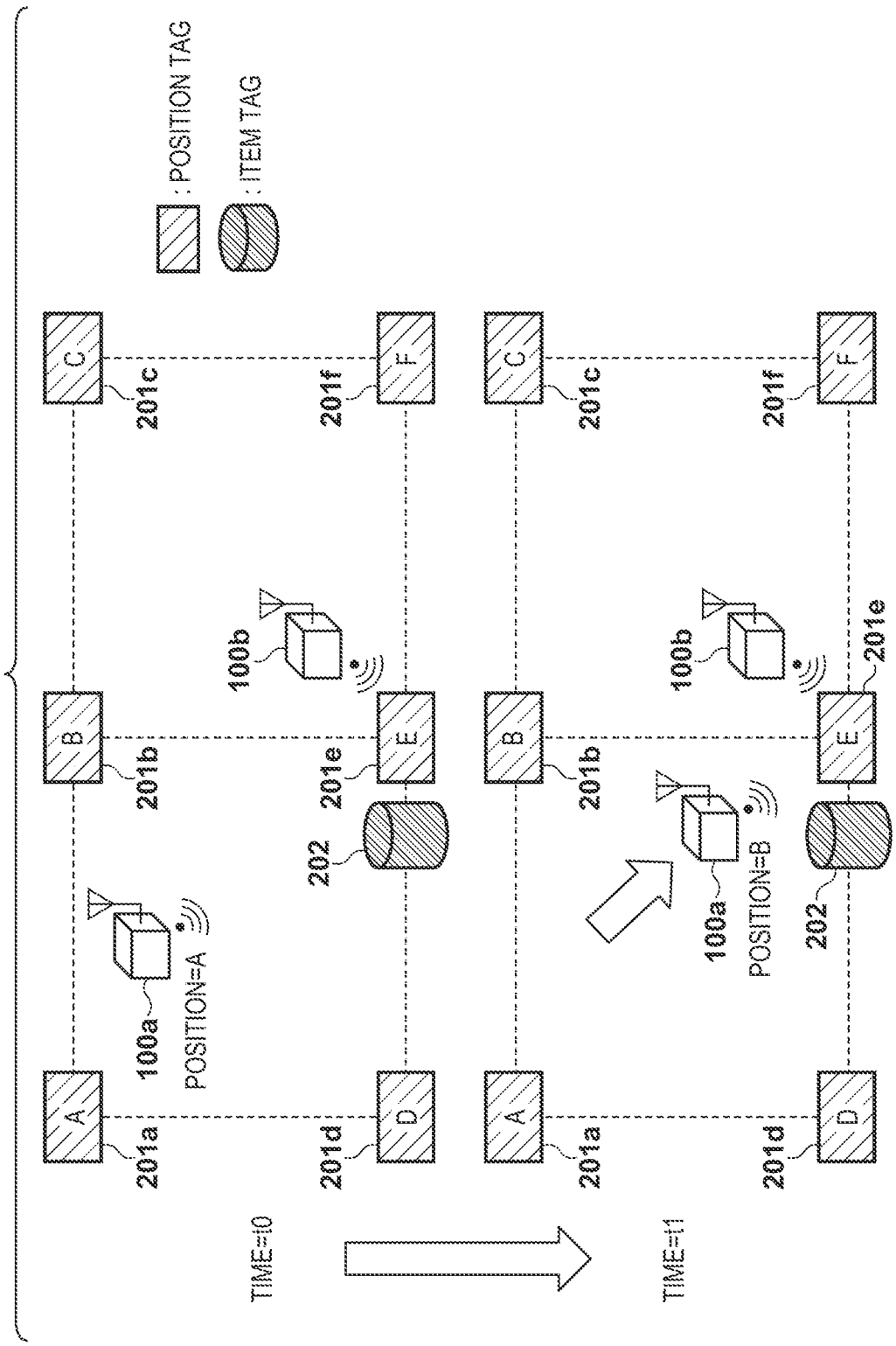
FIG. 3 is a view showing an operation example of the RFID reader according to the first embodiment.

FIG. 3 is a view showing an operation example of the RFID reader 100 (an example of the approach detection situation of the RFID reader) according to the first embodiment. In the example shown in FIG. 3, the RFID reader includes RFID readers 100a and 100b. In addition, the RFID tag includes a position tag A 201a to a position tag F 201f, each serving as the reference tag, and an article tag 202. Note that there may be three or more RFID readers, and the number of position tags may be larger or smaller than in the example shown in FIG. 3.

In the following description, the RFID readers 100a and 100b are generically referred to as the RFID readers 100, and the position tag A 201a to the position tag F 201f are generically referred to as the position tags 201. Each position tag 201 is an RFID tag arranged to detect the reference position. The position tag 201 is, for example, adhered to the floor or the like, and its arrangement position is fixed. The article tag 202 is an RFID tag adhered to an article serving as a management target.

Assume a situation in which, as shown in FIG. 3, the RFID reader 100a is moved from a position A (time=t0) to a position B (time=t1), and approaches the RFID reader 100b reading the position tag E 201e.

In the example shown in FIG. 3, at time=t0, the RFID reader 100a starts to move from the position A while performing detection of the RFID tag, and performs data communication and distance measurement with respect to the RFID reader 100b by Ultra Wide Band (UWB) communication.

When the RFID reader 100a arrives at the position B at time=t1, the RFID reader 100a detects approach to the RFID reader 100b, and inquires, by UWB communication, of the RFID reader 100b whether RFID tag reading is executed. As a result of the inquiry, the RFID reader 100a determines that the RFID reader 100b is in execution of RFID tag reading, and requests, by using UWB communication, the RFID reader 100b to transmit an RFID tag reading result. The RFID reader 100a may be configured not to execute reading at this time. As a result of the transmission request, the RFID reader 100a receives the reading result of the position tag E 201e from the RFID reader 100b, and acquires position information.

As described above, according to this embodiment, in an article position management system that uses portable RFID readers, a reference tag indicating a position serving as a reference, and an article tag attached to an article, even if the RFID readers approach each other and one of them enters a waiting state, this RFID reader can acquire information of the tag. Accordingly, it is possible to update information in real time to deal with a change in position of the article over time, and the traceability of the article can be improved.

As described above, in this embodiment, approach to another RFID reader is detected by using a communication method other than RFID. If the approach is detected, an RFID tag reading result is received from the other RFID reader. With this, position information can be acquired. Therefore, even in a state in which the RFID readers using the same channel approach each other, information can be acquired from the RFID tag.

Second Embodiment

In the second embodiment, an example will be described in which execution of RFID tag reading is arbitrated between RFID readers. This embodiment is different from the first embodiment in that, if an RFID reader 100 detects approach of another RFID reader, arbitration for deciding the RFID reader to execute RFID tag reading is performed. The system configuration and apparatus arrangement are similar to those in the first embodiment, so that a description thereof will be omitted.

Process

Figure 4A:
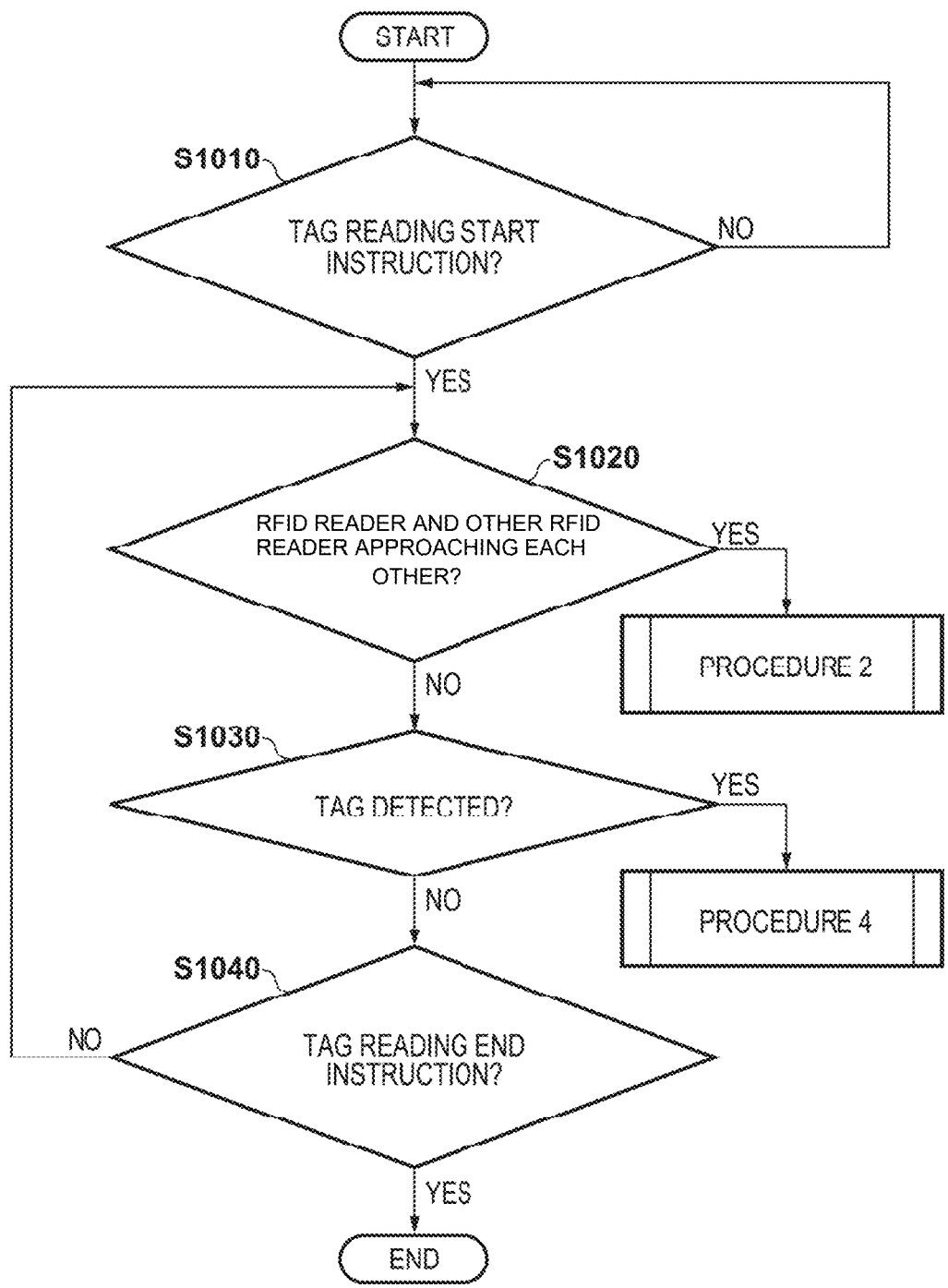
FIG. 4A is a flowchart illustrating the procedure of the overall process executed by an RFID reader according to the second embodiment.
Figure 4B:
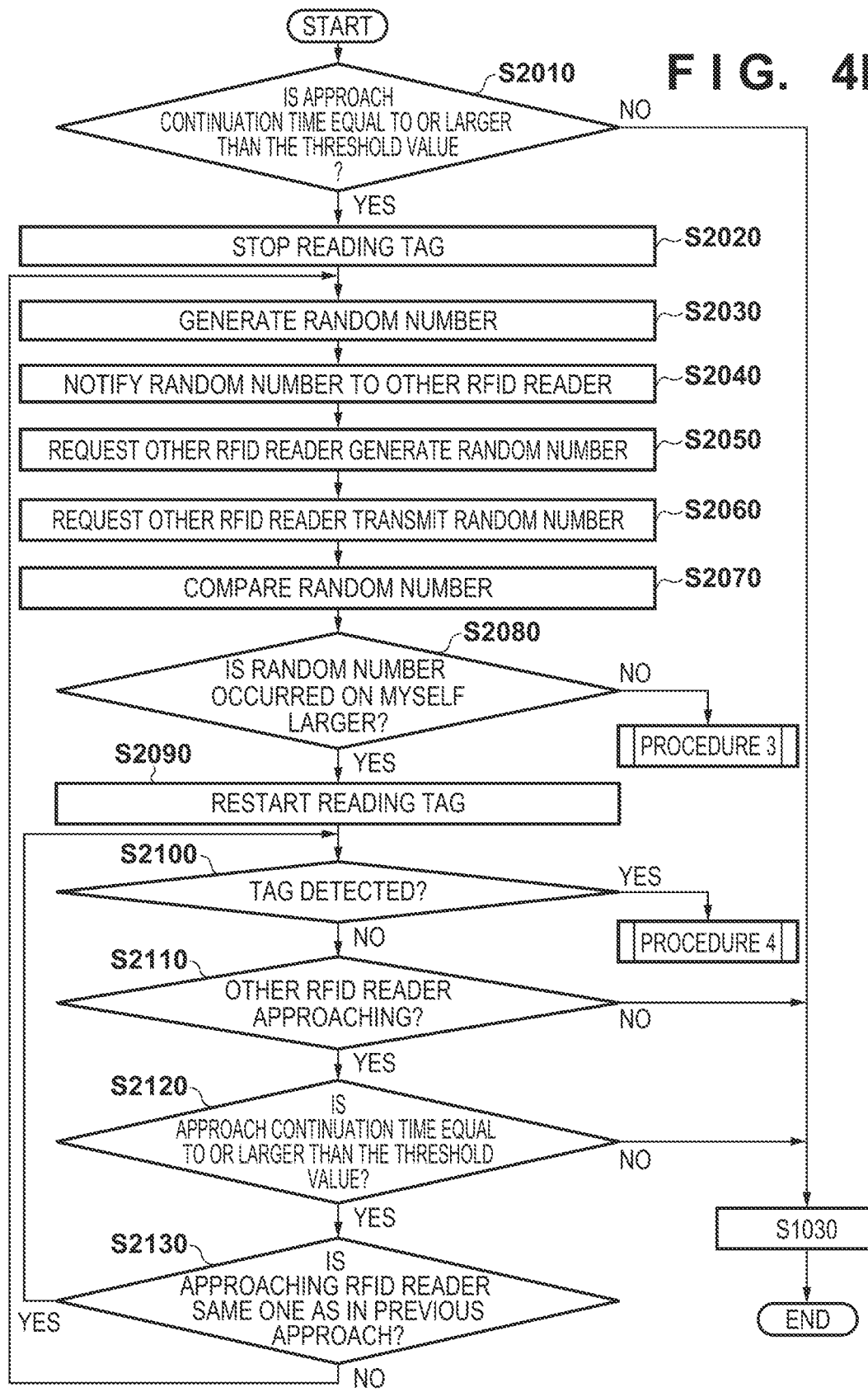
FIG. 4B is a flowchart illustrating the procedure of arbitration processing according to the second embodiment.
Figure 4C:
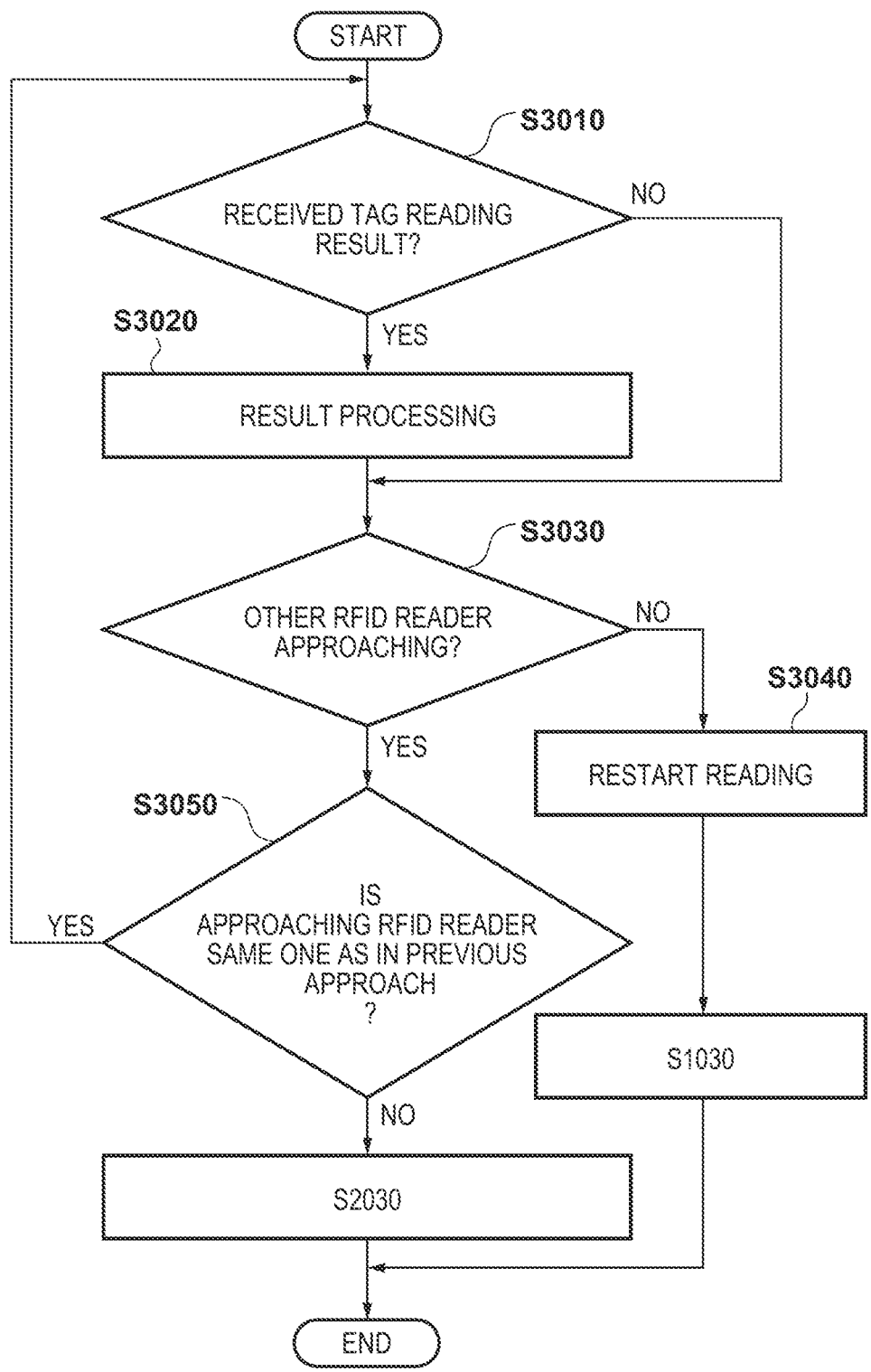
FIG. 4C is a flowchart illustrating the procedure of RFID reader approaching processing according to the second embodiment.
Figure 4D:
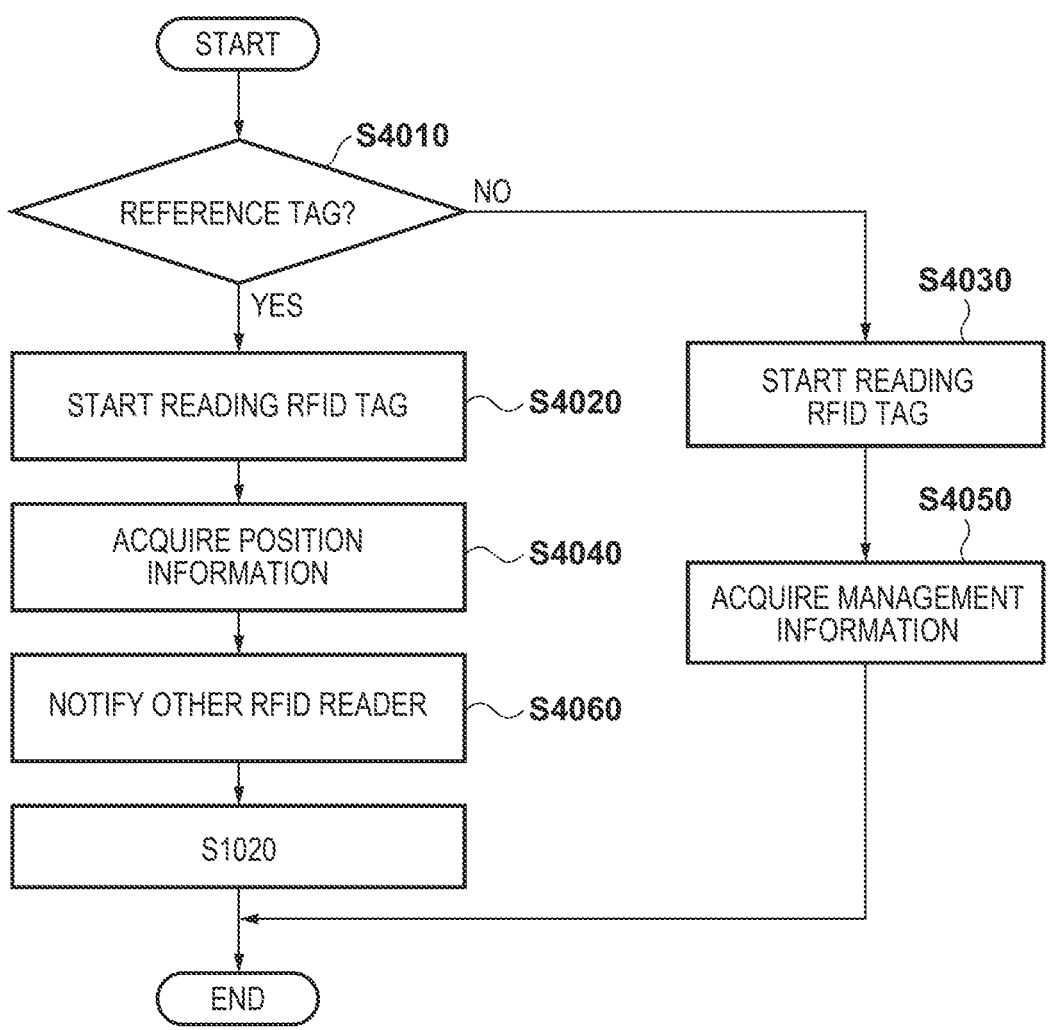
FIG. 4D is a flowchart illustrating the procedure of tag information acquisition processing according to the second embodiment.

With reference to flowcharts of FIGS. 4A to 4D, the procedure of a process executed by the RFID reader according to the second embodiment will be described. FIG. 4A is a flowchart illustrating the procedure of the overall process executed by the RFID reader according to the second embodiment. FIG. 4B is a flowchart illustrating the procedure of arbitration processing according to the second embodiment. FIG. 4C is a flowchart illustrating the procedure of RFID reader approaching processing according to the second embodiment. FIG. 4D is a flowchart illustrating the procedure of tag information acquisition processing according to the second embodiment.

Processing in step S1010 is similar to processing in step S101 of FIG. 2A. In step S1020, the RFID reader 100 measures the distance between the RFID reader 100 and another RFID reader by using the distance measurement function of an RFID reader communication circuit unit 105, thereby performing approach detection determination between the RFID reader 100 and another RFID reader. If approach of the RFID reader 100 to another RFID reader is detected, the RFID reader 100 advances to the arbitration processing of the procedure (2) shown in FIG. 4B. On the other hand, if approach of the RFID reader 100 to another RFID reader is not detected, the RFID reader 100 advances to step S1030.

Here, with reference to FIG. 4B, details of the arbitration processing of the procedure (2) will be described. In step S2010, the RFID reader 100 determines whether the approach state with the other RFID reader continues for a predetermined time or more. If the approach state with the other RFID reader continues for the predetermined time or more, the RFID reader 100 advances to step S2020. On the other hand, if the approach state with the other RFID reader does not continue for the predetermined time or more, the RFID reader 100 advances to step S1030.

In step S2020, after stopping the operation of an RFID tag reading circuit unit 103, the RFID reader 100 notifies, by using the communication function of the RFID reader communication circuit unit 105, the other RFID reader with which the approach state continues for the predetermined time or more that the approach has been detected. The other RFID reader having received the notification of the approach detection stops the operation of its own RFID tag reading circuit unit 103, and does not perform RFID tag reading until the arbitration processing ends.

In step S2030, the RFID reader 100 generates a random number for arbitration by using a random number generation unit 112. In step S2040, the RFID reader 100 transmits the random number for arbitration to the other RFID reader by using the communication function of the RFID reader communication circuit unit 105. In step S2050, the RFID reader 100 requests, by using the communication function of the RFID reader communication circuit unit 105, the other RFID reader to generate a random number for arbitration. The other RFID reader having received the generation request of a random number for arbitration generates a random number for arbitration by using its own random number generation unit 112.

In step S2060, the RFID reader 100 requests, by using the communication function of the RFID reader communication circuit unit 105, the other RFID reader to transmit the random number for arbitration. The other RFID reader having received the transmission request of the random number for arbitration transmits the random number for arbitration by using the communication function of its own RFID reader communication circuit unit 105.

In step S2070, the RFID reader 100 compares, by using a random number comparison unit 114, the random number for arbitration generated by the RFID reader 100 in step S2030 with the random number for arbitration received from the other RFID reader in step S2060.

In step S2080, the RFID reader 100 determines, as a result of the comparison of the random numbers for arbitration, whether the random number for arbitration generated by the RFID reader 100 is larger than the random number for arbitration generated by the other RFID reader. If the random number for arbitration generated by the RFID reader 100 is larger than the random number for arbitration generated by the other RFID reader, the RFID reader 100 advances to step S2090. On the other hand, if the random number for arbitration generated by the RFID reader 100 is equal to or smaller than the random number for arbitration generated by the other RFID reader, the RFID reader 100 advances to the RFID reader approaching processing of the procedure (3).

Here, with reference to FIG. 4C, details of the RFID reader approaching processing of the procedure (3) will be described. In step S3010, the RFID reader 100 determines whether an RFID tag reading result is received from the other RFID reader. If an RFID tag reading result is received from the other RFID reader, the RFID reader 100 advances to step S3020. On the other hand, if no RFID tag reading result is received from the other RFID reader, the RFID reader 100 advances to step S3030.

In step S3020, the RFID reader 100 acquires position information from the RFID tag reading result received from the other RFID reader. In step S3030, in order to check whether the approach state with another RFID reader has changed, the RFID reader 100 measures the distance with respect to another RFID reader by using the distance measurement function of the RFID reader communication circuit unit 105, thereby performing approach detection determination with respect to another RFID reader. If approach to another RFID reader is detected, the RFID reader 100 advances to step S3050. On the other hand, if approach to another RFID circuit is not detected, the RFID reader 100 advances to step S3040.

In step S3040, the RFID reader 100 restarts the operation of the RFID tag reading circuit unit 103 to execute RFID tag reading. Thereafter, the RFID reader 100 advances to step S1030.

In step S3050, the RFID reader 100 determines whether another RFID reader detected as approaching in step S3030 is the same as the other RFID reader detected as approaching in step S1020, thereby checking whether the approach state with the other RFID reader has changed. If YES in step S3050, the RFID reader 100 returns to step S3010. On the other hand, if NO in step S3050, the RFID reader 100 advances to step S2030.

Return to the description of FIG. 4B. In step S2090, the RFID reader 100 restarts the operation of the RFID tag reading circuit unit 103 to execute RFID tag reading. In step S2100, the RFID reader 100 determines whether an RFID tag is detected. If an RFID tag is detected, the RFID reader 100 advances to the tag information acquisition processing of the procedure (4). On the other hand, if no RFID tag is detected, the RFID reader 100 advances to step S2110.

Here, with reference to FIG. 4D, details of the tag information acquisition processing of the procedure (4) will be described. In step S4010, the RFID reader 100 determines whether the detected RFID tag is a reference tag. If the detected RFID tag is a reference tag, the RFID reader 100 advances to step S4020. On the other hand, if the detected RFID tag is not a reference tag, the RFID reader 100 advances to step S4030.

In step S4020, the RFID reader 100 executes reading of the RFID tag (reference tag). In step S4030, the RFID reader 100 executes reading of the RFID tag (article tag). In step S4040, the RFID reader 100 acquires position information based on the reading of the RFID tag (reference tag). In step S4050, the RFID reader 100 acquires management information based on the reading of the RFID tag (article tag), and then advances to step S1020. In step S4060, the RFID reader 100 transmits, by using the communication function of the RFID reader communication circuit unit 105, the RFID tag reading result to the other RFID reader in the approach state, and then advances to step S1020.

Return to the description of FIG. 4B. In step S2110, in order to check whether the approach state with another RFID reader has changed, the RFID reader 100 measures the distance with respect to another RFID reader by using the distance measurement function of the RFID reader communication circuit unit 105, thereby performing approach detection determination with respect to another RFID reader. If approach to another RFID reader is detected, the RFID reader 100 advances to step S2120. On the other hand, if approach to another RFID circuit is not detected, the RFID reader 100 advances to step S1030.

In step S2120, the RFID reader 100 determines whether the approach state with the other RFID reader continues for a predetermined time or more. If the approach state with the other RFID reader continues for the predetermined time or more, the RFID reader 100 advances to step S2130. On the other hand, if the approach state with the other RFID reader does not continue for the predetermined time or more, the RFID reader 100 advances to step S1030.

In step S2130, the RFID reader 100 determines whether the other RFID reader for which the approach continuation time is equal to or larger than the threshold value in step S2120 is the same as the other RFID reader for which the approach continuation time is equal to or larger than the threshold value in step S2010. Then, the RFID reader 100 checks whether the approach state with another RFID reader has changed. If YES in step S2130, the RFID reader 100 returns to step S2100. On the other hand, if NO in step S2130, the RFID reader 100 returns to step S2030.

Subsequently, in step S1030 of FIG. 4A, the RFID reader 100 determines whether an RFID tag is detected. If an RFID tag is detected, the RFID reader 100 advances to the tag information acquisition processing of the procedure (4). On the other hand, if no RFID tag is detected, the RFID reader 100 advances to step S1040.

In step S1040, the RFID reader 100 determines whether an RFID tag reading end instruction is accepted from the user. If an RFID tag reading end instruction is accepted from the user, the RFID reader 100 stops the operation of the RFID tag reading circuit unit 103, thereby stopping the communication with the RFID tag. On the other hand, if no RFID tag reading end instruction is accepted from the user, the RFID reader 100 returns to step S1020.

Operation Example of RFID Reader

Subsequently, with reference to FIGS. 5 and 6, an operation example of the RFID reader 100 (an example of the approach detection situation of the RFID reader) according to this embodiment will be described. Note that the arrangement of the RFID readers and RFID tags is similar to that in the first embodiment. The following description will be given assuming that an RFID reader 100a has arrived at a position B at time t1 and detected approach to an RFID reader 100b.

Figure 5:
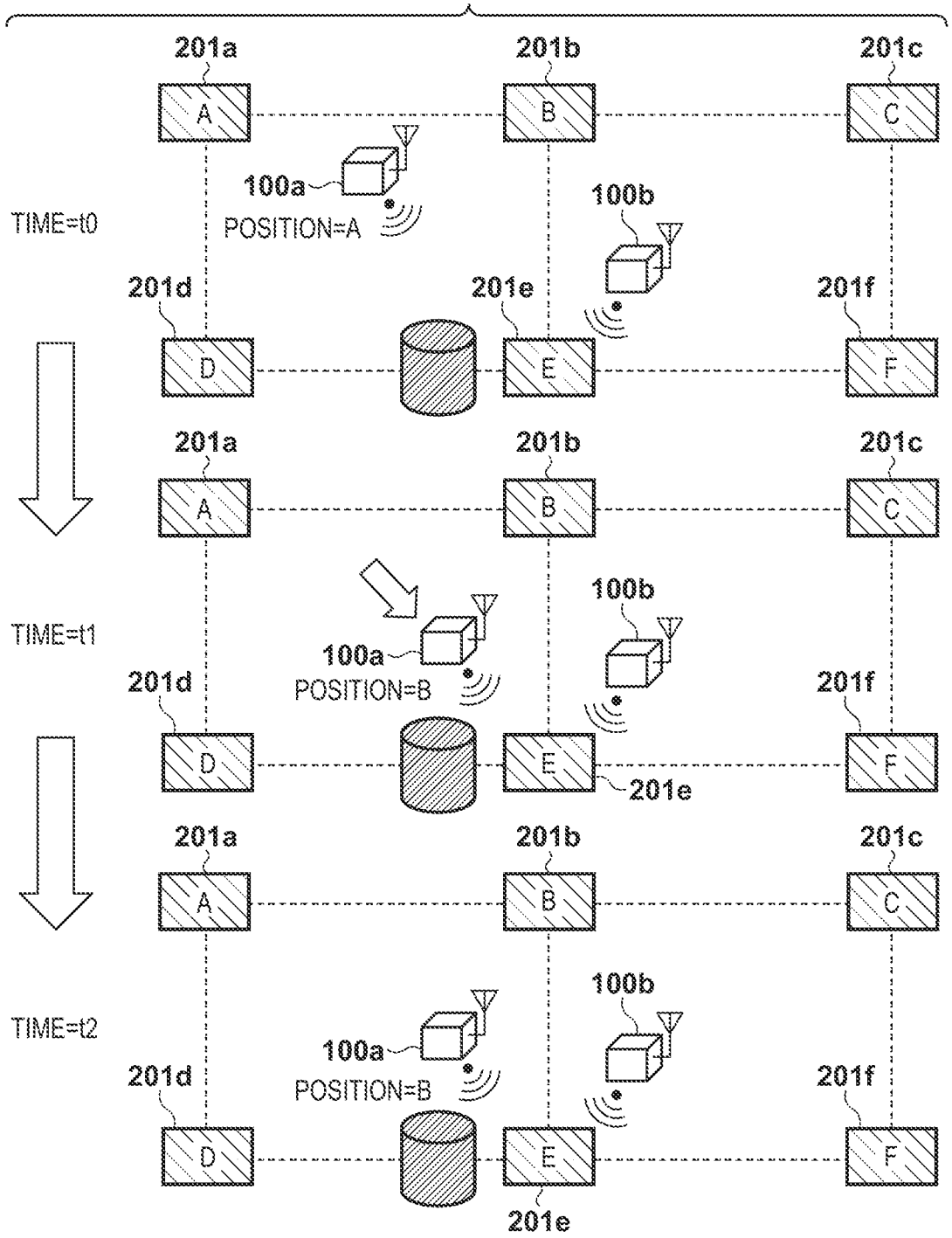
FIG. 5 is a view showing an operation example of the RFID reader according to the second embodiment.

In FIG. 5, after detecting approach to the RFID reader 100b, the RFID reader 100a determines whether the approach state continues for a time equal to or larger than a predetermined threshold value. As a result of the determination, if the elapse time from time t1 to time t2, which serves as the continuation time in the approach state between the RFID reader 100a and the RFID reader 100b, is equal to or larger than the threshold value, the RFID reader 100a determines that the approach state with the RFID reader 100b continues.

Figure 6:
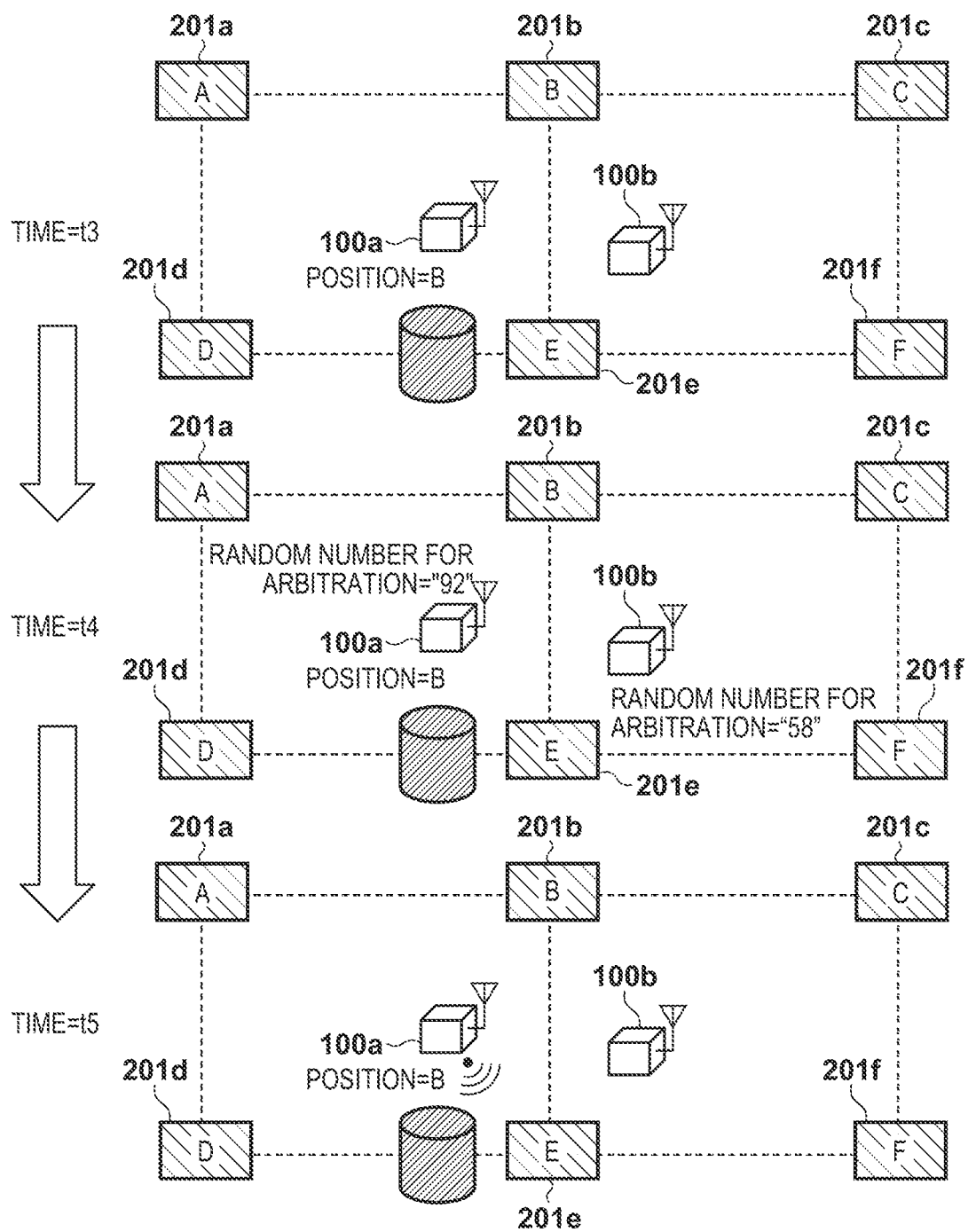
FIG. 6 is a view showing the operation example of the RFID reader according to the second embodiment.

At time t3 in FIG. 6, the RFID reader 100a stops the operation of its own RFID tag reading circuit unit 103 to stop RFID tag reading, and notifies, by using UWB communication, the RFID reader 100b that the approach has been detected. The RFID reader 100b having received the notification stops the operation of its RFID tag reading circuit unit 103, thereby stopping RFID tag reading.

At time t4 in FIG. 6, the RFID reader 100a generates a random number for arbitration by using its own random number generation unit 112, which is the value of 92 in this example. Then, the RFID reader 100a requests, by using UWB communication, the RFID reader 100b to generate and transmit a random number for arbitration. In accordance with the request, the RFID reader 100b generates a random number for arbitration by using its own random number generation unit 112. In the example shown in FIG. 6, the value of 58 is generated. Then, the RFID reader 100b transmits the generated random number to the RFID reader 100a by using UWB communication.

After receiving, by using UWB communication, the random number for arbitration generated by the RFID reader 100b, the RFID reader 100a compares, by using its own random number comparison unit 114, the random number for arbitration generated by the RFID reader 100a with the random number for arbitration generated by the RFID reader 100b. In this example, as a result of the comparison, the random number for arbitration generated by the RFID reader 100a is larger than the random number for arbitration generated by the RFID reader 100b. Therefore, the RFID reader 100a is decided as the RFID reader to execute RFID tag reading.

Then, at time t5 in FIG. 6, the RFID reader 100a restarts RFID tag reading. After restarting RFID tag reading, the RFID reader 100a reads a position tag E 201e, and then transmits a reading result to the RFID reader 100b by using UWB communication.

As described above, in this embodiment, execution of RFID tag reading is arbitrated between the RFID readers in the RFID reader control system. With this, occurrence of an LBT waiting time can be prevented, so that the position information of the RFID reader can be acquired in more real time than in the first embodiment. Accordingly, user convenience can be improved.

Note that in the embodiment described above, the numeric values of the random numbers are compared, and the RFID reader to execute reading is decided based on the comparison result. Here, an example of the process for a case in which the random numbers have the same value will be described. If the random numbers have the same value, since it is necessary to select one of the RFID readers, it may be configured such that, for example, the RFID reader that has compared the random numbers executes reading.

According to the present disclosure, even if RFID reader apparatuses approach each other and enter a waiting state, information of an RFID tag can be acquired.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-193606, filed Dec. 2, 2022, which is hereby incorporated by reference herein in its entirety.

What is claimed is:

1. A communication apparatus capable of executing reading of a Radio Frequency Identification (RFID) tag, the communication apparatus comprising:
an approach detection unit configured to detect, by using a predetermined communication method, approach of the communication apparatus to another communication apparatus capable of executing reading of the RFID tag; and
a reception unit configured to receive, by using the predetermined communication method, information of the RFID tag read by the other communication apparatus from the other communication apparatus,
wherein the predetermined communication method is a communication method different from RFID.

2. The communication apparatus according to claim 1, further comprising:
an inquiry unit configured to inquire, by using the predetermined communication method, of the other communication apparatus whether reading of the RFID tag is executed; and
a request unit configured to, if the other communication apparatus is in execution of the reading as a result of the inquiry by the inquiry unit, request, by using the predetermined communication method, the other communication apparatus to transmit information of the RFID tag as a reading result.

3. The communication apparatus according to claim 2, further comprising:
a tag detection unit configured to execute reading of a reference tag which is an RFID tag serving as a reference for specifying a position; and
a calculation unit configured to calculate a position of the communication apparatus with respect to the reference tag based on a reading result of the reference tag,
wherein, if the other communication apparatus is in execution of the reading as a result of the inquiry by the inquiry unit, the tag detection unit does not execute reading.

4. The communication apparatus according to claim 2, wherein
the reception unit receives the information of the RFID tag transmitted from the other communication apparatus in accordance with the transmission request by the request unit.

5. The communication apparatus according to claim 1, wherein
the approach detection unit measures a distance between the communication apparatus and the other communication apparatus by using the predetermined communication method and, if the distance is not more than a threshold value, detects the approach.

6. The communication apparatus according to claim 1, wherein
the predetermined communication method is Ultra Wide Band (UWB) communication.

7. A control method of a communication apparatus capable of executing reading of a Radio Frequency Identification (RFID) tag, the control method comprising:
detecting, by using a predetermined communication method, approach of the communication apparatus to another communication apparatus capable of executing reading of the RFID tag; and
receiving, by using the predetermined communication method, information of the RFID tag read by the other communication apparatus from the other communication apparatus,
wherein the predetermined communication method is a communication method different from RFID.

8. A non-transitory computer-readable storage medium storing a program for causing a computer to execute a control method of a communication apparatus capable of executing reading of a Radio Frequency Identification (RFID) tag, the control method comprising:
detecting, by using a predetermined communication method, approach of the communication apparatus to another communication apparatus capable of executing reading of the RFID tag; and
receiving, by using the predetermined communication method, information of the RFID tag read by the other communication apparatus from the other communication apparatus,
wherein the predetermined communication method is a communication method different from RFID.

9. A communication apparatus capable of executing reading of an Radio Frequency Identification (RFID) tag, the communication apparatus comprising:

an approach detection unit configured to detect, by using a predetermined communication method, approach of the communication apparatus to another communication apparatus capable of executing reading of the RFID tag; and an arbitration unit configured to decide one of the communication apparatus or the other communication apparatus to execute reading if the approach is detected by the approach detection unit; and a control unit configured to,
- if it is decided that the other communication apparatus executes reading as a result of the arbitration unit, request the other communication apparatus to transmit information of the RFID tag read by the other communication apparatus; and
- if it is decided that the communication apparatus executes reading as a result of the arbitration unit, transmit information of the RFID tag read by the communication apparatus to the other communication apparatus.

10. The communication apparatus according to claim 9, further comprising:
- a random number generation unit configured to generate a first random number; and
- a random number acceptance unit configured to accept, by using the predetermined communication method, a second random number generated by the other communication apparatus,
- wherein, based on a comparison result between the first random number and the second random number, the arbitration unit decides one of the communication apparatus or the other communication apparatus to execute reading.

11. The communication apparatus according to claim 10, wherein
- if the first random number is larger than the second random number, the arbitration unit decides the communication apparatus to execute reading.

* * * * *